(12) United States Patent
Wang et al.

(10) Patent No.: US 11,074,755 B2
(45) Date of Patent: Jul. 27, 2021

(54) METHOD, DEVICE, TERMINAL DEVICE AND STORAGE MEDIUM FOR REALIZING AUGMENTED REALITY IMAGE

(71) Applicant: Tencent Technology (Shenzhen) Company Limited, Shenzhen (CN)

(72) Inventors: Zhibin Wang, Shenzhen (CN); Huazheng Qin, Shenzhen (CN); Qianyi Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 16/590,205

(22) Filed: Oct. 1, 2019

(65) Prior Publication Data
US 2020/0035034 A1 Jan. 30, 2020

Related U.S. Application Data

(63) Continuation of application No. PCT/CN2017/107816, filed on Oct. 26, 2017.

(51) Int. Cl.
*G06T 19/00* (2011.01)
*G06T 7/70* (2017.01)
(Continued)

(52) U.S. Cl.
CPC .......... *G06T 19/006* (2013.01); *G06T 7/0002* (2013.01); *G06T 7/70* (2017.01);
(Continued)

(58) Field of Classification Search
None
See application file for complete search history.

(56) References Cited

U.S. PATENT DOCUMENTS 6,437,798 B1 * 8/2002 Aoki .................. G06T 15/10
345/419
9,699,438 B2 7/2017 Walsh
(Continued)

FOREIGN PATENT DOCUMENTS

CN 101881922 A 11/2010
CN 103077546 A 5/2013
(Continued)

OTHER PUBLICATIONS

Tencent Technology, WO, PCT/CN2017/107816, dated Jul. 11, 2018, 4 pgs.
(Continued)

*Primary Examiner* — David H Chu
(74) *Attorney, Agent, or Firm* — Morgan, Lewis & Bockius LLP

(57) ABSTRACT

A method for implementing an augmented reality picture is performed at a computing device having a camera, including: obtaining a picture frame and a pose direction of the camera during shooting of the picture frame; determining a framing space in a 3D rectangular coordinate system in accordance with that the camera shoots in a shooting mode; determining 2D graphics in the framing space, and obtaining 3D coordinates of a position reference point of each 2D graphic; for each 2D graphic, adjusting a pose based on a rotation datum point of the two-dimensional graphic, and obtaining 3D coordinates of a position reference point of the pose-adjusted 2D graphic; and projecting, through perspective projection transformation, the 3D coordinates of the position reference point of the two-dimensional graphic to be 2D coordinates in a corresponding planar projection area, and rendering the 2D graphic on the picture frame according to the 2D coordinates.

20 Claims, 10 Drawing Sheets

(51) Int. Cl.
  *G06T 7/00* (2017.01)
  *G06T 15/00* (2011.01)
  *G06T 19/20* (2011.01)
(52) U.S. Cl.
  CPC ............ *G06T 15/005* (2013.01); *G06T 19/20* (2013.01); *G06T 2207/30244* (2013.01); *G06T 2219/008* (2013.01); *G06T 2219/2016* (2013.01)

(56) References Cited

U.S. PATENT DOCUMENTS

| | | | |
|---|---|---|---|
| 2007/0248283 A1 | 10/2007 | Mack et al. | |
| 2012/0154391 A1* | 6/2012 | Jung | G06T 15/30 345/419 |
| 2014/0375684 A1* | 12/2014 | Algreatly | G06T 7/344 345/633 |
| 2015/0022552 A1* | 1/2015 | Ito | G06T 11/00 345/633 |
| 2015/0029553 A1* | 1/2015 | Fujimoto | H04N 1/00411 358/1.15 |
| 2015/0358578 A1* | 12/2015 | Lee | H04N 7/141 348/14.01 |
| 2016/0012596 A1* | 1/2016 | Stehle | G06K 9/46 382/131 |
| 2016/0163075 A1 | 6/2016 | Bae et al. | |
| 2016/0180441 A1* | 6/2016 | Hasan | G06Q 30/0643 705/26.7 |
| 2016/0381256 A1* | 12/2016 | Aguirre-Valencia | H04N 13/30 348/46 |
| 2017/0249784 A1* | 8/2017 | Ohnishi | G06F 3/0488 |
| 2017/0358138 A1* | 12/2017 | Dack | G06F 3/011 |
| 2018/0005027 A1* | 1/2018 | Touret | G06K 9/228 |
| 2018/0070019 A1* | 3/2018 | Laurent | H04N 5/23206 |
| 2018/0157047 A1* | 6/2018 | Chapman | G02B 27/017 |
| 2018/0210627 A1* | 7/2018 | Woo | G06F 3/04845 |

FOREIGN PATENT DOCUMENTS

| | | |
|---|---|---|
| CN | 104094318 A | 10/2014 |
| CN | 104322052 A | 1/2015 |

OTHER PUBLICATIONS

Tencent Technology, IPRP, PCT/CN2017/107816, dated Apr. 28, 2020, 5 pgs.
Tencent Technology, ISR, PCT/CN2017/107816, dated Jul. 11, 2018, 3pgs.

* cited by examiner

METHOD, DEVICE, TERMINAL DEVICE AND STORAGE MEDIUM FOR REALIZING AUGMENTED REALITY IMAGE

CROSS-REFERENCE TO RELATED APPLICATION

This application is a continuation application of PCT/CN2017/107816, entitled "METHOD AND APPARATUS FOR IMPLEMENTING AN AUGMENTED REALITY PICTURE, TERMINAL DEVICE, AND STORAGE MEDIUM" filed on Oct. 26, 2017, which is incorporated by reference in its entirety.

FIELD OF THE TECHNOLOGY

This application relates to the field of computer technologies, and in particular, to a method and an apparatus for implementing an augmented reality picture, a terminal device, and a storage medium.

BACKGROUND OF THE DISCLOSURE

With the development of smart user equipment, an Augmented Reality (AR) technology is increasingly applied in common user equipment, such as a mobile phone, a tablet computer, a handheld game console, and the like. For example, user equipment can shoot an image that fuses a real scenario and a virtual three-dimensional element.

However, a three-dimensional model usually needs to be established for virtual elements in an existing augmented reality solution.

SUMMARY

According to an aspect of this application, a method for implementing an augmented reality picture is provided, including the following steps: obtaining a picture frame and a pose direction of a camera during shooting of the picture frame; determining a framing space in a three-dimensional rectangular coordinate system in accordance with that the camera shoots in a shooting mode, the shooting mode being a shooting mode that uses one point in the three-dimensional rectangular coordinate system as a shooting position and that has a shooting direction the same as the pose direction; determining two-dimensional graphics in the framing space, and obtaining three-dimensional coordinates of a position reference point of each determined two-dimensional graphic in the three-dimensional rectangular coordinate system; for each determined two-dimensional graphic, adjusting a pose based on a rotation datum point of the two-dimensional graphic, so that the two-dimensional graphic is at a predetermined angle with respect to the pose direction, and obtaining three-dimensional coordinates of a position reference point of the pose-adjusted two-dimensional graphic, the position reference point being located in a plane where the two-dimensional graphic is located; and projecting, through perspective projection transformation, the three-dimensional coordinates of the position reference point of the two-dimensional graphic to be two-dimensional coordinates in a corresponding planar projection area, and rendering, in the planar projection area, the two-dimensional graphic onto the picture frame according to the two-dimensional coordinates.

According to an aspect of this application, a method for implementing an augmented reality picture is provided, which is suitable to be performed in a picture processing application client in a terminal device. The terminal device includes a processor and a memory. The memory stores instructions executable to the processor. The processor implements the method by executing the instructions. The method includes: obtaining a picture frame and a pose direction of a camera during shooting of the picture frame; determining a framing space in a three-dimensional rectangular coordinate system in accordance with that the camera shoots in a shooting mode, the shooting mode being a shooting mode that uses one point in the three-dimensional rectangular coordinate system as a shooting position and that has a shooting direction the same as the pose direction; determining two-dimensional graphics in the framing space, and obtaining three-dimensional coordinates of a position reference point of each determined two-dimensional graphic in the three-dimensional rectangular coordinate system, the position reference point being located in a plane where the two-dimensional graphic is located; and for each determined two-dimensional graphic, adjusting a pose based on a rotation datum point of the two-dimensional graphic, so that the two-dimensional graphic is at a predetermined angle with respect to the pose direction, and obtaining three-dimensional coordinates of a position reference point of the pose-adjusted two-dimensional graphic; and projecting, through perspective projection transformation, the three-dimensional coordinates of the position reference point of the two-dimensional graphic to be two-dimensional coordinates in a corresponding planar projection area, and rendering, in the planar projection area, the two-dimensional graphic onto the picture frame according to the two-dimensional coordinates.

According to another aspect of this application, an apparatus for implementing an augmented reality picture is provided, including an obtaining unit, a modeling unit, an analysis unit, an adjustment unit, and a rendering unit. The obtaining unit is configured to obtain a picture frame and a pose direction of a camera during shooting of the picture frame. The modeling unit is configured to determine a framing space in a three-dimensional rectangular coordinate system in accordance with that the camera shoots in a shooting mode, the shooting mode being a shooting mode that uses one point in the three-dimensional rectangular coordinate system as a shooting position and that has a shooting direction the same as the pose direction. The analysis unit is configured to determine two-dimensional graphics in the framing space, and obtain three-dimensional coordinates of a position reference point of each determined two-dimensional graphic in the three-dimensional rectangular coordinate system. For each determined two-dimensional graphic, the adjustment unit is configured to adjust a pose based on a rotation datum point of the two-dimensional graphic, so that the two-dimensional graphic is at a predetermined angle with respect to the pose direction, and obtain three-dimensional coordinates of a position reference point of the pose-adjusted two-dimensional graphic. In addition, the adjustment unit may be further configured to project, through perspective projection transformation, the three-dimensional coordinates of the position reference point of the two-dimensional graphic to be two-dimensional coordinates in a corresponding planar projection area. The rendering unit is configured to render, in the planar projection area, the two-dimensional graphic onto the picture frame according to the two-dimensional coordinates.

According to another aspect of this application, a terminal device is provided, including: one or more processors, a memory, and one or more programs. The one or more programs are stored in the memory and are configured to be performed by the one or more processors. The one or more programs include instructions for implementing the method for implementing an augmented reality picture according to this application.

According to another aspect of this application, a storage medium is provided. The storage medium stores one or more programs. The one or more programs include instructions, and the instructions, when executed by a computing device, enable the computing device to perform the method for implementing an augmented reality picture according to this application.

BRIEF DESCRIPTION OF THE DRAWINGS

To describe the technical solutions in the embodiments of this application or in the prior art more clearly, the following briefly introduces the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some, rather than all, of the embodiments of this application. All other embodiments obtained by a person of ordinary skill in the art based on the embodiments in this application without creative efforts shall fall within the protection scope of this application.

Augmented Reality (AR) is a technology for fusing a virtual element (or referred to as a virtual object) in an image of a real scenario. In an application scenario, a terminal device shoots an image of a real scenario through a camera. The terminal device may further generate or obtain, from a network, a three-dimensional model of a virtual element. On this basis, the terminal device may fuse the virtual element with the shot image of the real scenario, and display the fused image in a screen. Herein, the terminal device may be a mobile phone, a personal digital assistant (PDA), a notebook computer, a tablet computer, or the like. In addition to the terminal device, the augmented reality technology may also be applied to intelligent devices such as a helmet or glass intelligent device.

The implementation solution of an augmented reality picture according to this application may be applied to, for example, a terminal device, a helmet or glass intelligent device, and other scenarios, but is not limited thereto. In the implementation solution of an augmented reality picture according to this application, a virtual element with a stereo effect may be fused into a real scenario by using a two-dimensional picture of the virtual element, and it is unnecessary to establish a three-dimensional model for the virtual element. In this way, the solution in this application can omit the process of establishing a three-dimensional model for the virtual element.

Figure 1A:
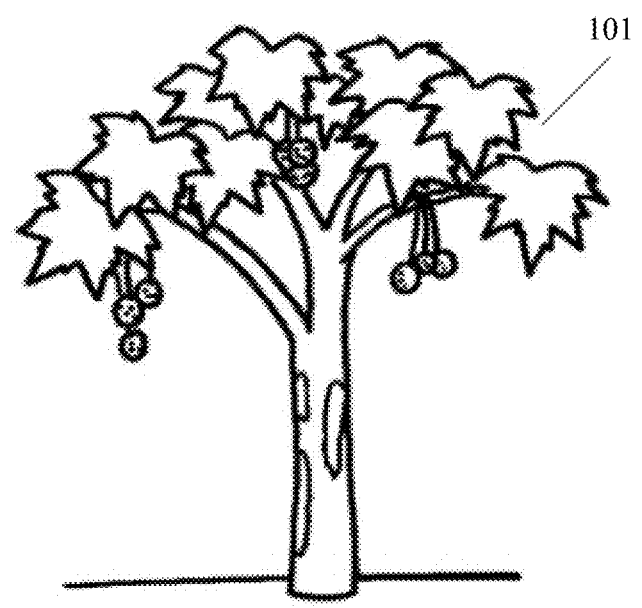
FIG. 1A is a schematic diagram of an application scenario.
Figure 1A:
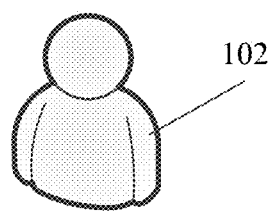
Figure 1B:
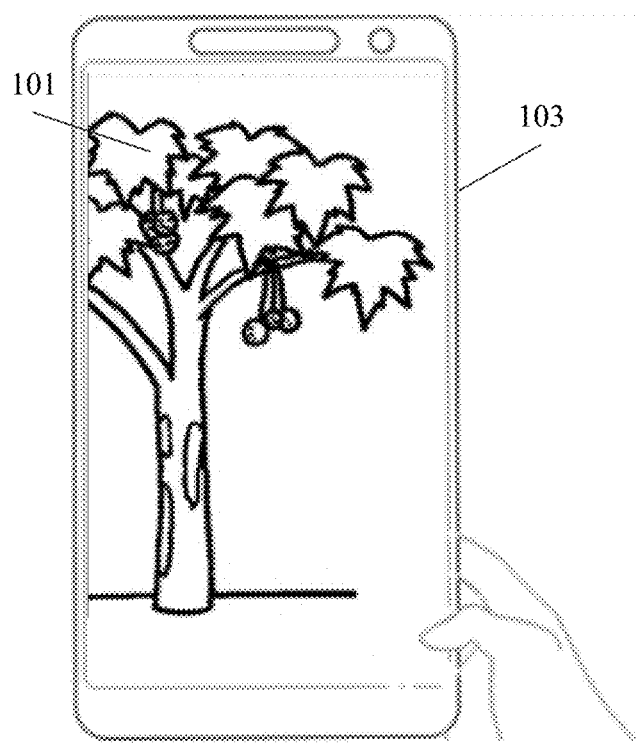
FIG. 1B is a schematic diagram of an image 101 shot by a mobile terminal 103.
Figure 1C:
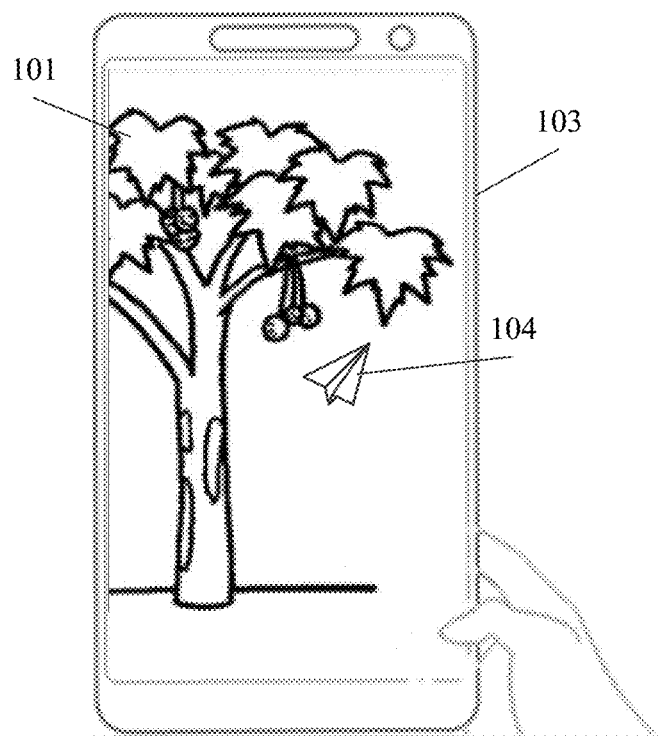
FIG. 1C is a schematic diagram of adding a virtual element to FIG. 1B.
Figure 1D:
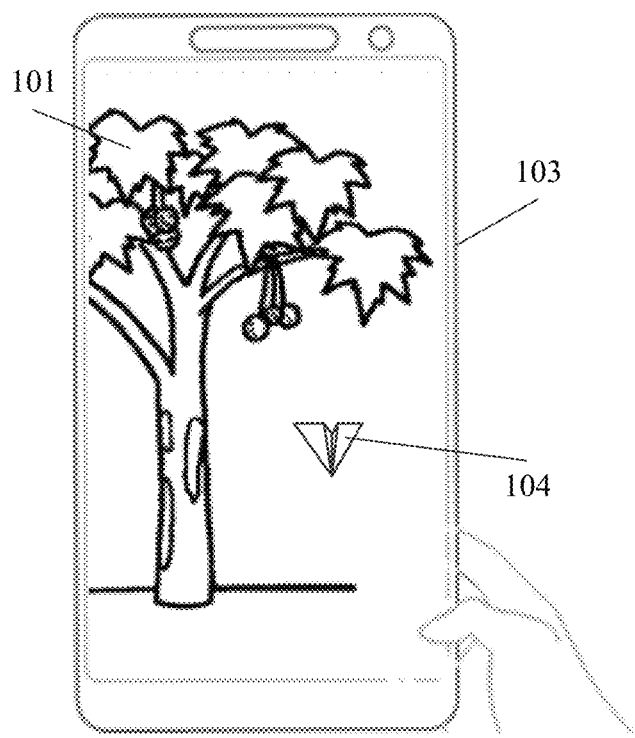
FIG. 1D is a schematic diagram of FIG. 1C after a pose and a position of the virtual element are changed.
Figure 1E:
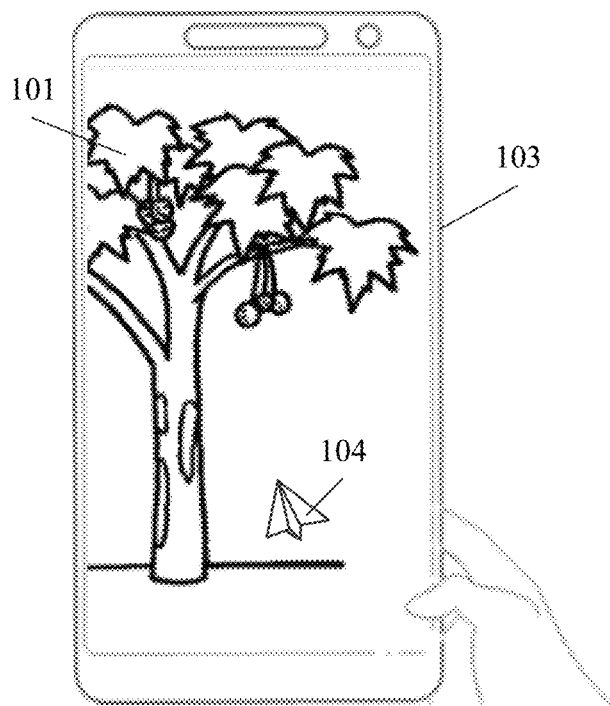
FIG. 1E is a schematic diagram of FIG. 1D after a pose and a position of the virtual element are changed.

FIG. 1A is a schematic diagram of an application scenario. As shown in FIG. 1A, a user 102 shoots an image 101 by using a mobile terminal (not shown). The image 101 includes a tree. FIG. 1B is a schematic diagram of an image 101 shot by a mobile terminal 103. Herein, FIG. 1B is a real shot image, which shows a partial area of a tree. FIG. 1C is a two-dimensional graphic in which a virtual element 104 (that is, the paper airplane in the figure) is added based on FIG. 1B. FIG. 1D is a schematic diagram after a pose and a position of the virtual element 104 in FIG. 1C are changed. FIG. 1E is a schematic diagram after a pose and a position of the virtual element 104 in FIG. 1D are changed. In the method for implementing an augmented reality picture according to this application, respective two-dimensional graphics corresponding to different poses may be displayed in a reality picture, thus avoiding establishing a three-dimensional model for a virtual element in different poses.

Figure 1F:
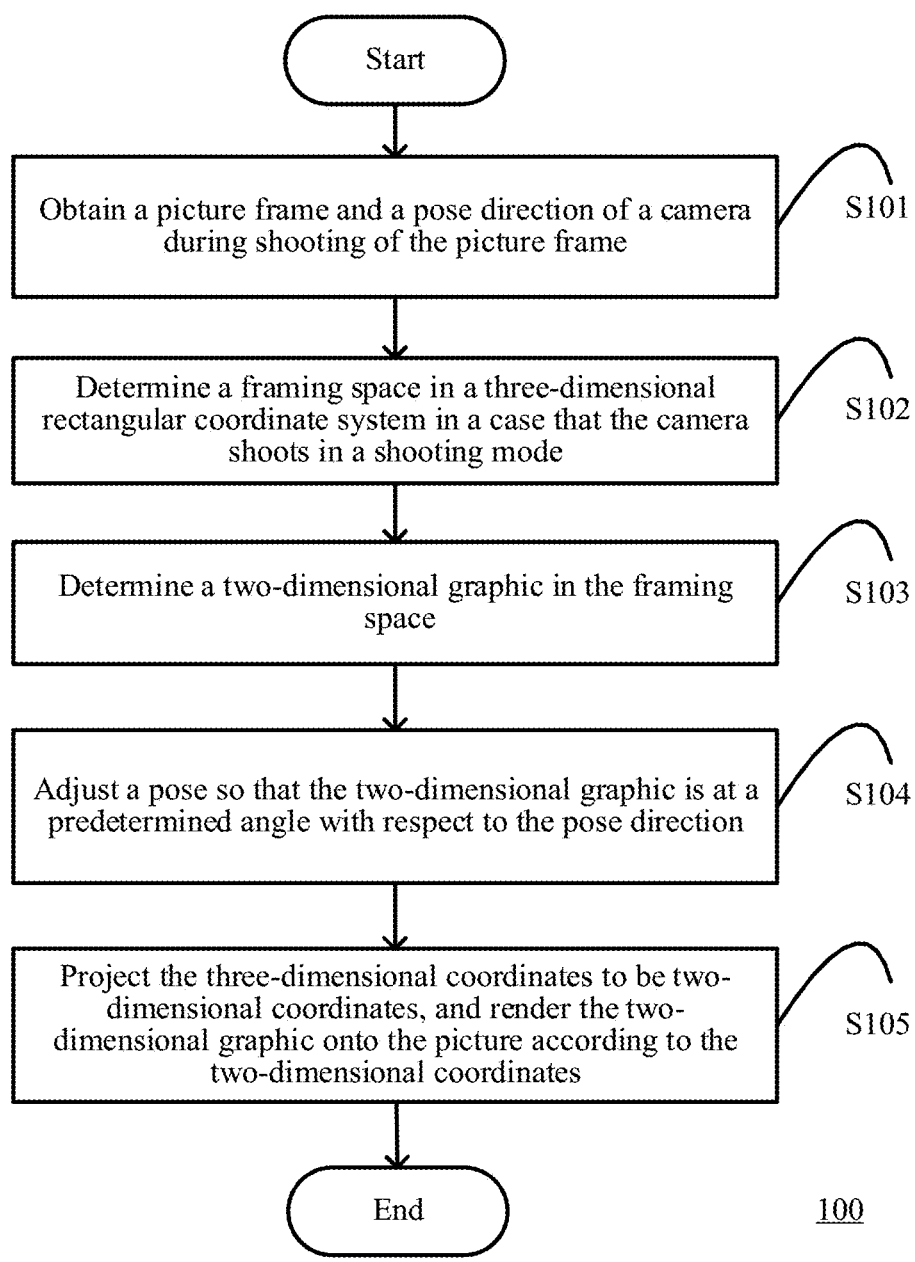
FIG. 1F is a flowchart of a method 100 for implementing an augmented reality picture according to some embodiments of this application.

FIG. 1F is a flowchart of a method 100 for implementing an augmented reality picture according to some embodiments of this application. Herein, the method 100 may be, for example, performed in a picture application. The picture application, for example, may reside in a terminal device, but is not limited thereto. The picture application may be AR APP client software, and various other picture processing APP clients (such as various beautifying and photoshop software).

The method 100 begins with step S101. In step S101, a picture frame and a pose direction of a camera during shooting of the picture frame are obtained.

In an embodiment, in step S101, a picture frame may be obtained from the camera in real time. A gyroscope in the terminal device may acquire pose information of the terminal device in real time. Herein, a pose refers to a posture and a form of an object (such as a virtual element) in a three-dimensional space, for example, an orientation and a bearing. The pose information is used for describing an orientation, a bearing, and the like of the terminal device in a three-dimensional space, and may include an orientation parameter (such as an angle), a bearing parameter (such as a position and an angle), and the like. The orientation of the terminal device may be represented by using, for example, an orientation of a camera or a screen orientation, but is not limited thereto. In step S101, pose information of the camera during shooting of the picture frame may be obtained from the gyroscope. The gyroscope is also referred to as an angular velocity sensor, and may be used for movement pose measurement. Physical parameters that can be measured by the gyroscope may include a rotation angular velocity during deflection or inclination. The pose information of the terminal device may be determined according to the physical parameters and outputted. In step S101, a pose direction of the camera may be determined according to the pose information. Herein, the pose direction is a lens orientation of the camera. In this embodiment, the source of the pose information is not limited to the gyroscope, but may also be other hardware devices, in the terminal device, which can obtain the pose information, or a software application for calculating a camera pose.

In another embodiment, at least one picture frame and pose information corresponding to each picture frame are stored in the terminal device. In this way, in step S101, a picture frame and pose information corresponding to the picture frame may be obtained locally (for example, from an album). According to the pose information, in step S101, the pose direction of the camera during shooting of the picture frame can be determined.

In another embodiment, in step S101, a picture frame and pose information corresponding to the picture frame are obtained through a network. According to the pose information, a pose direction corresponding to the picture frame is determined. For example, in step S101, the picture frame and the corresponding pose information may also be obtained from a picture server or other terminal devices.

In conclusion, in step S101, the picture and the pose direction may be obtained by using any of the foregoing exemplary methods, but the obtaining method is not limited thereto. For the picture frame and the pose direction obtained in step S101, step S102 of the method 100 may be performed, to determine a framing space. Specifically, in step S102, a framing space in a three-dimensional rectangular coordinate system in accordance with that the camera shoots in a shooting mode is determined. Herein, the shooting mode is a shooting mode that uses one point in the three-dimensional rectangular coordinate system as a shooting position and that has a shooting direction the same as the pose direction. In step S102, the camera may also be construed as a virtual camera. A parameter of the virtual camera is consistent with that of a camera corresponding to the picture frame obtained in step S101 (that is, a real camera that shoots the picture frame). For example, the parameter of the camera is a focal length.

In an embodiment, in step S102, a view frustum is determined first. The view frustum corresponds to a shooting mode that uses an origin of the three-dimensional rectangular coordinate system as a shooting position and has a shooting direction the same as the pose direction. In the view frustum, a frustum intercepted by a near plane and a far plane is the framing space of the camera when the camera shoots in this shooting mode. Both the near plane and the far plane are perpendicular to the pose direction. In other words, only objects in the framing space can be photographed in a picture shot based on this shooting mode. In this embodiment, the virtual camera may be considered as located at the origin of the three-dimensional rectangular coordinate system. Herein, the parameter of the virtual camera may determine positions of the near plane and the far plane in the view frustum. In other words, the parameter of the virtual camera may determine respective distances from the near plane and the far plane to the virtual camera. Therefore, when the picture obtained in step S101 is shot by a local terminal device, camera parameters of the virtual camera and the terminal device are the same. When the camera is configured with an adjustable focal length, the near plane and the far plane are dependent on the parameter of the camera during shooting of the picture. In another case, if the picture frame obtained in step S101 is not shot by the local camera (that is, the camera of the terminal device performing the method 100), the virtual camera is used for simulating the camera that shoots the picture frame.

Figure 2:
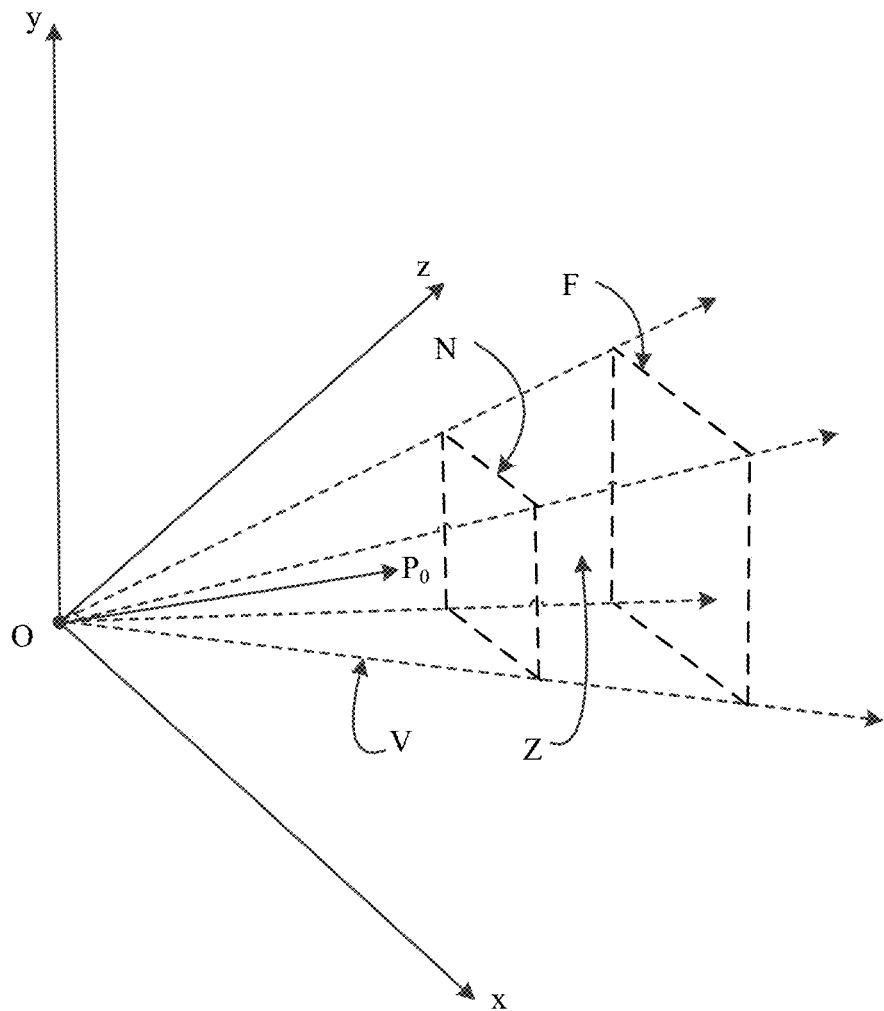
FIG. 2 is a schematic diagram of a framing space according to an embodiment.

In conclusion, in step S102, a framing space of a virtual camera may be determined. From another perspective, in step S102, a perspective projection matrix about the virtual camera is actually established. Perspective projection belongs to central projection. A perspective projection view is referred to as a perspective view or perspective for short, which is a graphic obtained by projecting an object from a projection center to a single projection plane. The perspective projection matrix is a mathematical model about the view frustum and the framing space above. The perspective projection matrix may be established by using many methods, which are not described in detail herein. FIG. 2 is a schematic diagram of a framing space according to an embodiment. As shown in FIG. 2, the coordinate system (x, y, z) is the three-dimensional coordinate system in step S101. A vector $OP_0$ represents the pose direction (that is, the shooting direction of the virtual camera) determined in step S101. V is a view frustum, N represents a near plane, F represents a far plane, and a frustum-shaped area Z is a framing space.

In step S102, after the framing space is determined, step S103 of the method 100 may be performed, to determine two-dimensional graphics in the framing space, and obtain three-dimensional coordinates of a position reference point of each determined two-dimensional graphic in the three-dimensional rectangular coordinate system. Herein, the two-dimensional graphic is used for recording a two-dimensional image of a three-dimensional object. Generally, the two-dimensional image may occupy the entire two-dimensional graphic, or may occupy only a partial area of the two-dimensional graphic. The position reference point is located in a plane where the two-dimensional graphic is located. In an embodiment, the two-dimensional graphic is a rectangular area. For example, the position reference point may be four vertices in the rectangular area, or may be a central point of each side of the rectangular area, but is not limited thereto. In another embodiment, the two-dimensional graphic is a trapezoidal. The position reference points are, for example, four vertices of the trapezoidal area. In another embodiment, the two-dimensional graphic is an irregular graphic. Herein, the position reference point may be three points that are in a plane where the irregular graphic is located and that are not on the same straight line. In a word, the position reference point may be used for representing a plane where the two-dimensional graphic is located in space and a position in the plane, and is not described in detail herein.

In an embodiment, an application scenario of the method 100 is as follows: The picture application acquires a picture frame (for example, the picture application in the terminal device is aligned with an environment for shooting) in real time. During obtaining of the first picture frame (that is, when the picture application performs the method 100 for the first time), in step S103, at least one two-dimensional graphic may be arranged in the three-dimensional rectangular coordinate system according to a predetermined policy first. Each two-dimensional graphic moves in a space of the three-dimensional rectangular coordinate system according to a respective predetermined trajectory. On this basis, in step S103, two-dimensional graphics currently located in the framing space may be determined. In addition, in step S103, three-dimensional coordinates of a position reference point of each determined two-dimensional graphic in the three-dimensional rectangular coordinate system may be obtained. The two-dimensional graphic is a two-dimensional image for carrying a three-dimensional object. In other words, the two-dimensional graphic is a container of a two-dimensional image. The two-dimensional graphic may be, for example, a two-dimensional area in various shapes, for example, a rectangular area, but is not limited thereto. To simplify the description, a rectangular area is used as an example to describe the two-dimensional graphic. In the rectangular area, two-dimensional images may be pictures of virtual elements such as a fallen leaf, a snowflake, and a pentagram, but are not limited thereto. The virtual elements are generated, for example, by a three-dimensional particle system. In other words, the three-dimensional particle system controls an initial position, a movement trajectory, a movement speed, a movement pose, and the like of the virtual element according to a predetermined policy. Herein, the three-dimensional particle system represents a technology for simulating some particular blur phenomena in three-dimensional computer graphics, and such phenomena are realistic movement rules that can hardly be implemented by using other conventional rendering technologies. Phenomena that are usually simulated by using the particle system include fire, an explosion, smoke, flowing water, sparks, a falling leaf, cloud, fog, snow, dust, a meteor trail, an abstract visual effect such as a shining trajectory, and the like. Each virtual element in this embodiment is a particle. A position and movement of a particle in a three-dimensional space are controlled by a transmitter. The transmitter is mainly represented by using a set of particle behavior parameters and a position in the three-dimensional space. The particle behavior parameters may include a particle generation speed (that is, the quantity of particles generated per unit time), an initial speed vector of the particle (for example, the particle moves towards which direction at what time), a particle lifetime (how long it takes for the particle to annihilate), a particle color, changes of the particle in the life cycle, other parameters, and the like. When the picture application performs step S103 for a subsequent picture frame, three-dimensional coordinates of a two-dimensional graphic in a framing range currently (that is, at a time point when the picture frame is shot) may be obtained from the three-dimensional particle system, and it is no longer necessary to rearrange two-dimensional graphics in the three-dimensional rectangular coordinate system according to the predetermined policy.

For each determined two-dimensional graphic in step S103, step S104 and step S105 in the method 100 may be performed.

In step S104, a pose is adjusted based on a rotation datum point of the two-dimensional graphic, so that the two-dimensional graphic is at a predetermined angle with respect to the pose direction, and three-dimensional coordinates of a position reference point of the pose-adjusted two-dimensional graphic are obtained. Herein, the rotation datum point refers to a point with a constant spatial position on the two-dimensional graphic in accordance with that the two-dimensional graphic is not subject to translation movement to adjust the pose direction (that is, the orientation of the two-dimensional graphic). For example, if the two-dimensional graphic is rectangular, the rotation datum point is a central point of the rectangle (that is, an intersection of diagonal lines). For another example, if the two-dimensional graphic is an irregular graphic, the rotation datum point may be a point roughly in a central area of the irregular graphic, which is not limited in this application.

In the foregoing embodiment, relative position relationships of the position reference point and the rotation datum point of the two-dimensional graphic with respect to the two-dimensional graphic are preconfigured. After the two-dimensional graphic in the framing space is determined, positions of the position reference point and the rotation datum point may be determined according to the preconfigured relative position relationships, so that the foregoing steps can be implemented based on the position reference point and the rotation datum point.

In an embodiment, the y-axis is set as the vertical direction. The predetermined angle is, for example, 90 degrees, but is not limited thereto. Herein, step S104 may include two rotation operations.

Figure 3A:
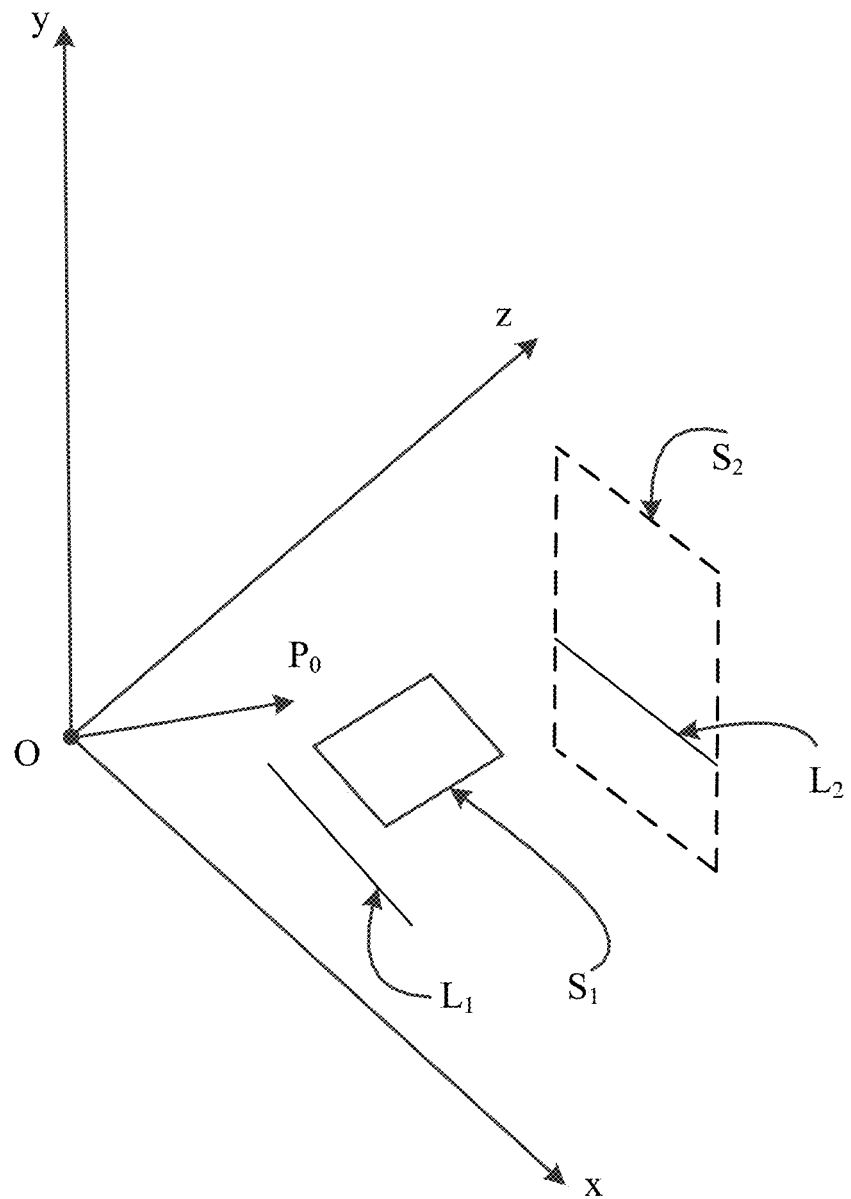
FIG. 3A is a schematic diagram of a spatial position of a two-dimensional graphic before the first rotation.
Figure 3B:
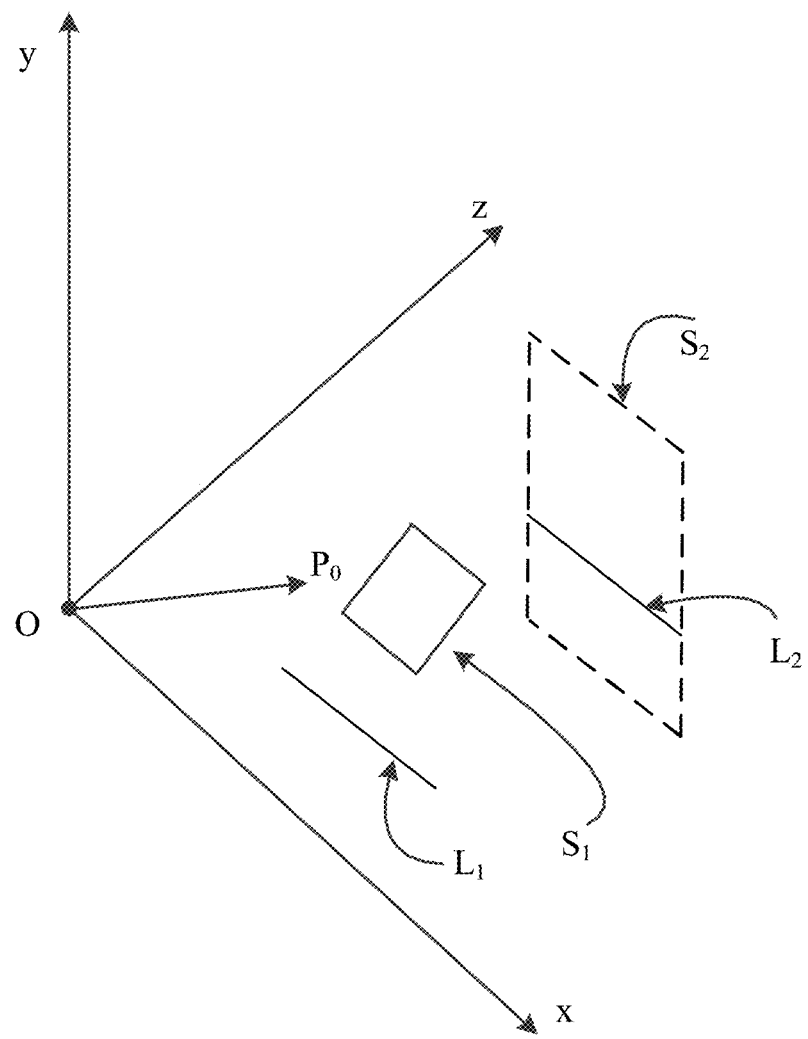
FIG. 3B is a schematic diagram of a spatial position of a two-dimensional graphic after the first rotation.

A specific process of the first rotation operation is as follows: rotating the two-dimensional graphic to a corresponding rotation position by using a first line, which passes through the rotation datum point and is parallel to the y-axis, as a rotation central axis, so that a first intersection line is parallel to a second intersection line. The first intersection line is an intersection line between a plane where the two-dimensional graphic is located and a horizontal plane, and the second intersection line is an intersection line between a vertical plane and a horizontal plane of the pose direction. FIG. 3A is a schematic diagram of a spatial position of the two-dimensional graphic before the first rotation, where $S_1$ represents the two-dimensional graphic, $S_2$ represents the vertical plane of the pose direction $OP_0$, $L_1$ represents the first intersection line, and $L_2$ represents the second intersection line. FIG. 3B is a schematic diagram of a spatial position of the two-dimensional graphic after the first rotation.

Figure 3C:
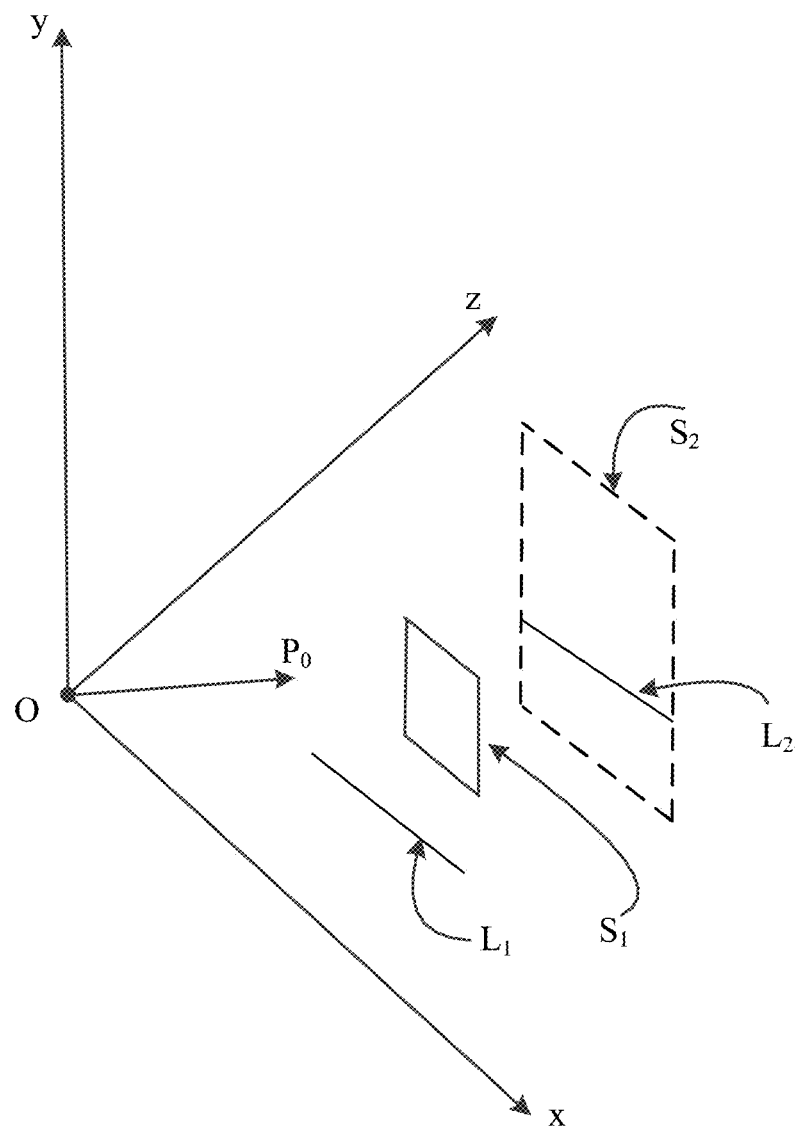
FIG. 3C is a schematic diagram of a spatial position of a two-dimensional graphic after the second rotation.

A specific process of the second rotation operation is as follows: rotating the two-dimensional graphic at the rotation position to a vertical plane parallel to the pose direction by using a second line, which passes through the rotation datum point and is parallel to the second intersection line, as a rotation central axis. FIG. 3C is a schematic diagram of a spatial position of the two-dimensional graphic after the second rotation.

The foregoing embodiment is merely an example for description. Step S104 in this application may also be implemented by using other algorithms commonly known, which are not described herein again. In a word, step S104 can enable the two-dimensional graphic to form a predetermined angle with respect to the pose direction.

In step S105, the three-dimensional coordinates of the position reference point of the two-dimensional graphic are projected to be two-dimensional coordinates in a corresponding planar projection area through perspective projection transformation, and the two-dimensional graphic is rendered onto the picture frame in the planar projection area according to the two-dimensional coordinates. Herein, the perspective projection transformation is coordinate transformation performed based on the perspective projection matrix described above. The planar projection area is located in the far plane of the virtual camera.

In conclusion, in the method 100 according to this application, the pose of the two-dimensional graphic of the virtual element can be adjusted, so that the two-dimensional graphic can form a predetermined angle with respect to the lens orientation of the virtual camera. In this way, in the method 100 in this application, when the two-dimensional graphic is rendered onto a reality picture, the rendering result does not have a "paper-like" effect of the two-dimensional graphic. Therefore, the rendering result has an effect of fusing the three-dimensional virtual element with the reality picture, while it is unnecessary to establish a three-dimensional model for the virtual element.

In some embodiments, each two-dimensional graphic includes a graphic sequence about a three-dimensional object. In the graphic sequence, each graphic is a two-dimensional image of the three-dimensional object. In step S105, the picture frame obtained in step S101 may be disposed in a planar projection area. In addition, in step S105, a graphic corresponding to the picture frame is selected from the graphic sequence included in the two-dimensional graphic. Based on two-dimensional coordinates of the two-dimensional graphic in the planar projection area, the selected graphic may be rendered onto the picture frame in step S105.

Figure 4:
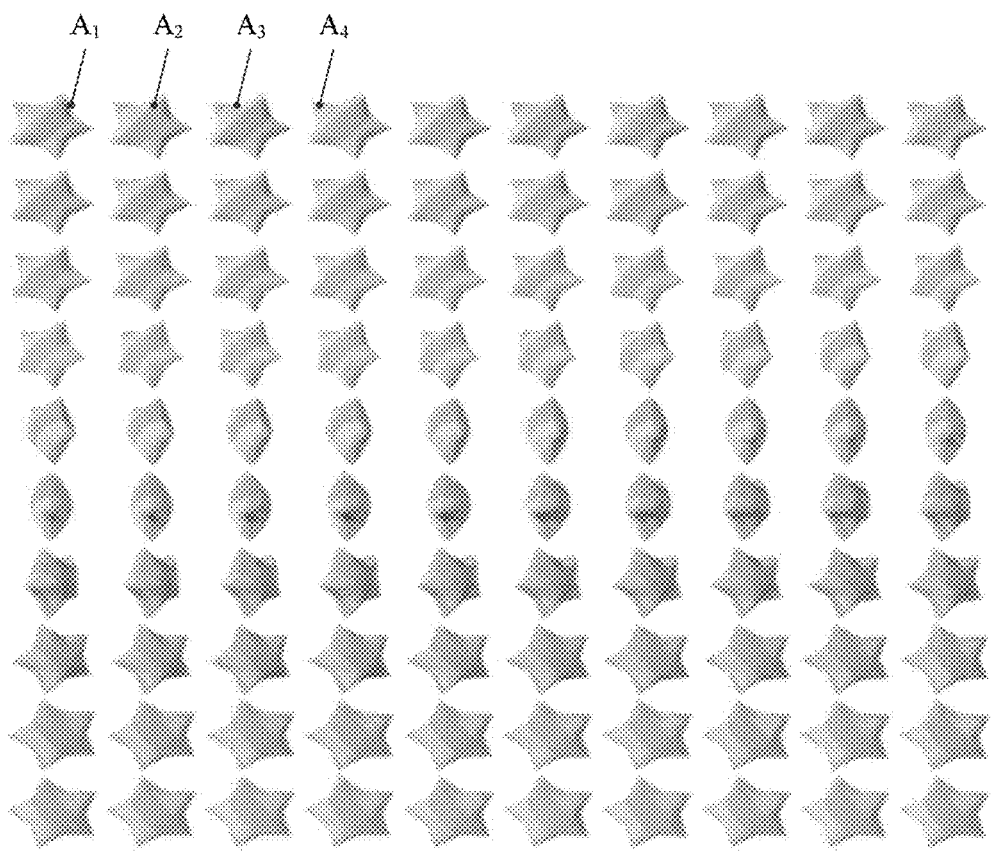
FIG. 4 is a schematic diagram of a graphic sequence of a three-dimensional object.

In an embodiment, the graphic sequence is associated with a cycle timer (not shown). Each graphic in the graphic sequence is associated with a time interval of the cycle timer. The graphic sequence is described below with reference to FIG. 4. FIG. 4 shows a graphic sequence of a three-dimensional object. The graphic sequence in FIG. 4 is two-dimensional images of a pentagram at various rotation angles. Using graphics $A_1$, $A_2$, $A_3$, and $A_4$ in FIG. 4 as an example, a time interval corresponding to the graphic $A_1$ is [0 ms, 30 ms], a time interval corresponding to the graphic $A_2$ is (30 ms, 60 ms], a time interval corresponding to the graphic $A_3$ is (60 ms, 90 ms], and a time interval corresponding to the graphic $A_4$ is (90 ms, 120 ms]. Correspondingly, a method for selecting a graphic in step S105 is as follows: selecting, according to a time interval to which a current time value of the cycle timer belongs, a graphic associated with the time interval from the graphic sequence as the graphic corresponding to the picture frame. For example, the current time value of the timer is 100 ms, and 100 ms is in the time interval corresponding to the graphic $A_4$. Therefore, in step S105, the graphic $A_4$ is rendered onto the picture.

In another embodiment, a two-dimensional image of each graphic in the graphic sequence is an image of the three-dimensional object that rotates to a corresponding rotation angle based on a predetermined rotation axis. In other words, assuming that the three-dimensional object rotates in front of the lens of the camera, the graphic sequence may include images of the three-dimensional object that are shot at multiple rotation angles. Correspondingly, in step S105, a rotation angle of the two-dimensional graphic may be determined first, and then a graphic having a rotation angle the same as the determined rotation angle is selected from the graphic sequence as the graphic corresponding to the picture frame.

In conclusion, in the method for implementing an augmented reality picture according to this application, by selecting a graphic in the graphic sequence, an animation effect of rotation of the element can be observed in multiple frames of picture rendered continuously, thus further enhancing a stereo effect of the virtual element in the rendered picture.

Figure 5:
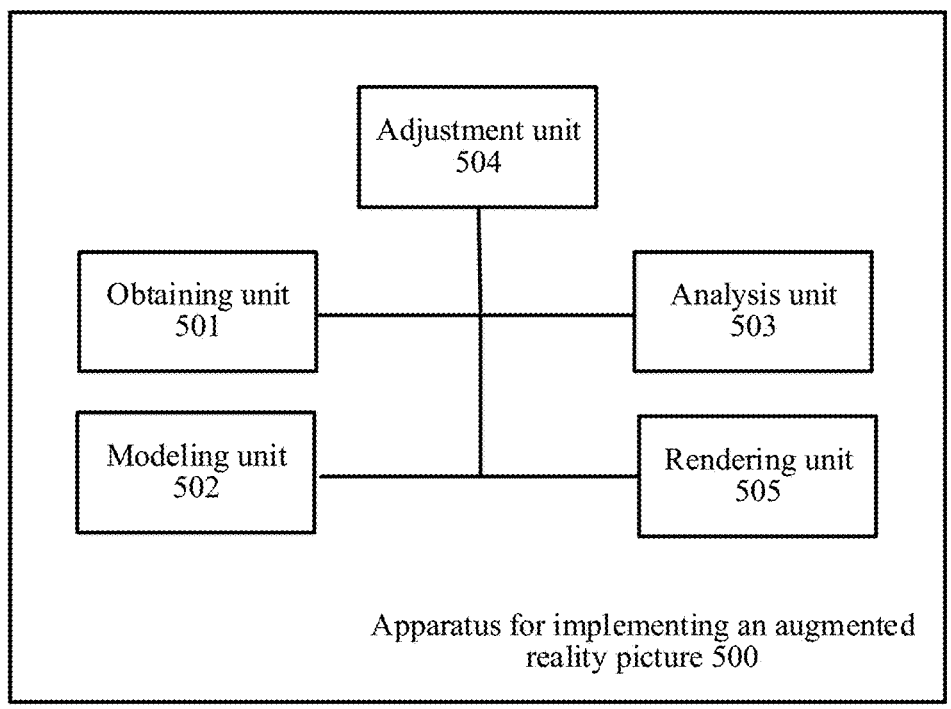
FIG. 5 is a schematic diagram of an apparatus 500 for implementing an augmented reality picture according to some embodiments of this application.

FIG. 5 is a schematic diagram of an apparatus 500 for implementing an augmented reality picture according to some embodiments of this application. The apparatus 500, for example, resides in a picture application. The picture application resides in a terminal device.

As shown in FIG. 5, the apparatus 500 includes an obtaining unit 501, a modeling unit 502, an analysis unit 503, an adjustment unit 504, and a rendering unit 505.

The obtaining unit 501 is configured to obtain a picture frame and a pose direction of a camera during shooting of the picture frame.

In an embodiment, obtaining unit 501 is configured to obtain, from a gyroscope, pose information of the camera during shooting of the picture frame, so as to determine the pose direction.

In another embodiment, obtaining unit 501 may obtain a picture frame and pose information of the picture frame that are stored locally, so as to determine the pose direction.

In another embodiment, obtaining unit 501 may obtain, through a network, a picture frame and pose information of the picture frame, so as to determine the pose direction.

The modeling unit 502 is configured to determine a framing space in a three-dimensional rectangular coordinate system in accordance with that the camera shoots in a shooting mode. The shooting mode is a shooting mode that uses one point in the three-dimensional rectangular coordinate system as a shooting position and that has a shooting direction the same as the pose direction. In an embodiment, the modeling unit 502 may determine a view frustum. The view frustum corresponds to a shooting mode that uses an origin of the three-dimensional rectangular coordinate system as a shooting position and has a shooting direction the same as the pose direction. On this basis, the modeling unit 502 may determine a framing space in the view frustum in accordance with that the camera shoots in the shooting mode.

The analysis unit 503 is configured to determine two-dimensional graphics in the framing space, and obtain three-dimensional coordinates of a position reference point of each determined two-dimensional graphic in the three-dimensional rectangular coordinate system.

In an embodiment, the analysis unit 503 may arrange at least one two-dimensional graphic in the three-dimensional rectangular coordinate system according to a predetermined policy. Each two-dimensional graphic moves in the three-dimensional rectangular coordinate system according to a respective predetermined trajectory. On this basis, the analysis unit 503 may determine a two-dimensional graphic currently in the framing space. In addition, the analysis unit 503 may further obtain three-dimensional coordinates of a position reference point of each determined two-dimensional graphic in the three-dimensional rectangular coordinate system.

For each determined two-dimensional graphic, the adjustment unit 504 is configured to adjust a pose based on a rotation datum point of the two-dimensional graphic, so that the two-dimensional graphic is at a predetermined angle with respect to the pose direction, and obtain three-dimensional coordinates of a position reference point of the pose-adjusted two-dimensional graphic. In addition, the adjustment unit 504 projects, through perspective projection transformation, the three-dimensional coordinates of the position reference point of the two-dimensional graphic to be two-dimensional coordinates in a corresponding planar projection area. In an embodiment, the three-dimensional rectangular coordinate system includes an x-axis, a y-axis, and a z-axis. The y-axis is in a vertical direction. The predetermined angle is 90 degrees. The adjustment unit 504 may move the two-dimensional graphic into a vertical plane parallel to the pose direction through two operations. The first operation includes: rotating the two-dimensional graphic to a corresponding rotation position by using a first line, which passes through the rotation datum point and is parallel to the y-axis, as a rotation central axis, so that a first intersection line is parallel to a second intersection line. The first intersection line is an intersection line between a plane where the two-dimensional graphic is located and a horizontal plane. The second intersection line is an intersection line between a vertical plane and a horizontal plane of the pose direction. The second operation includes: rotating the two-dimensional graphic at the rotation position after the first operation to a vertical plane parallel to the pose direction by using a second line, which passes through the rotation datum point and is parallel to the second intersection line, as a rotation central axis.

The rendering unit 505 is configured to render, in the planar projection area, the two-dimensional graphic onto the picture frame according to the two-dimensional coordinates. In some embodiments, each determined two-dimensional graphic includes a graphic sequence about a three-dimensional object. Each graphic in the graphic sequence is a two-dimensional image of the three-dimensional object. The rendering unit 505 may dispose the picture frame in the planar projection area. In addition, the rendering unit 505 may further select graphic corresponding to the picture frame from the graphic sequences comprised in the two-dimensional graphic. Finally, the rendering unit 505 renders the selected graphic onto the picture frame based on the two-dimensional coordinates.

In an embodiment, the graphic sequence is associated with a cycle timer (not shown). Each graphic in the graphic sequence is associated with a time interval of the cycle timer. In this embodiment, the rendering unit 505 may select, according to a time interval to which a current time value of the cycle timer belongs, a graphic associated with the time interval from the graphic sequence as the graphic corresponding to the picture frame.

In another embodiment, a two-dimensional image of each graphic in the graphic sequence is an image of the three-dimensional object that rotates to a corresponding rotation angle based on a predetermined rotation axis. In this embodiment, the rendering unit 505 may first determine a rotation angle of the two-dimensional graphic, and then select, from the graphic sequence, a graphic having a rotation angle the same as the determined rotation angle as the graphic corresponding to the picture frame. A more detailed implementation of the apparatus 500 is the same as that of the method 200, and details are not described herein again.

Figure 6:
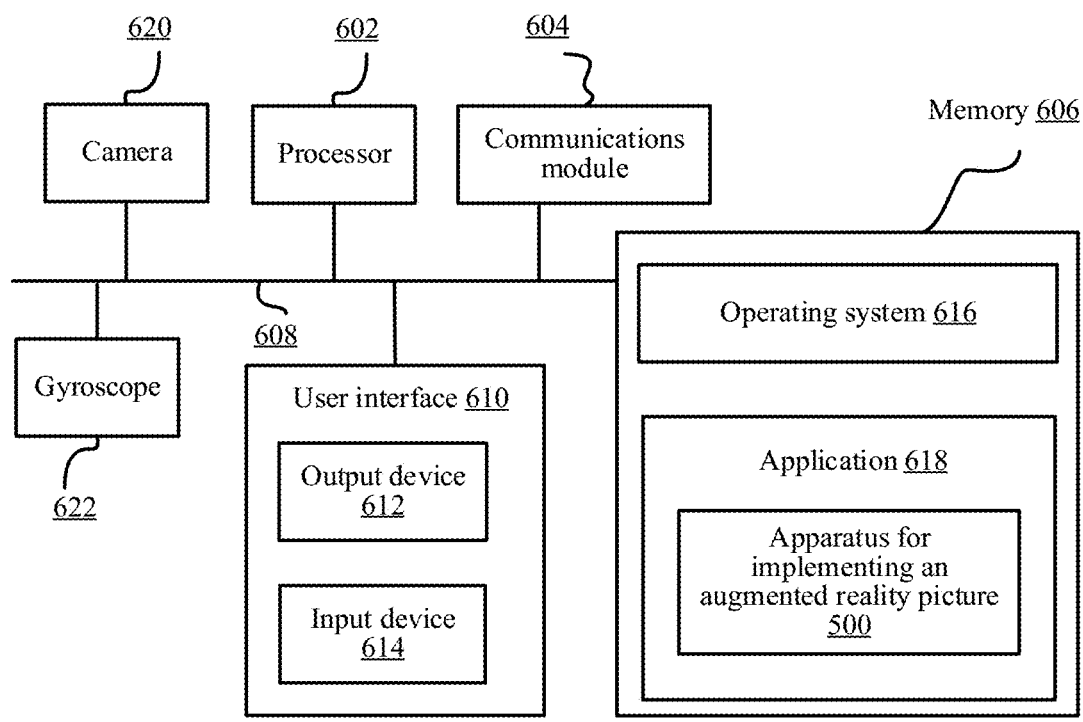
FIG. 6 is a structural diagram of a terminal device according to some embodiments of this application.

FIG. 6 is a structural diagram of a terminal device according to some embodiments of this application. As shown in FIG. 6, the terminal device includes one or more processors (CPUs) 602, a communications module 604, a memory 606, a user interface 610, a camera 620, a gyroscope 622, and a communications bus 608 configured to interconnect these components.

The processor 602 may receive or transmit data through the communications module 604 to implement network communication and/or local communication.

The user interface 610 includes one or more output devices 612, including one or more loudspeakers and/or one or more visual displays. The user interface 610 also includes one or more input devices 614. The user interface 610 may, for example, receive an instruction from a remote control unit, but is not limited thereto.

The memory 606 may be a high-speed random access memory, such as a DRAM, a SCRAM, a DDR RAM, or other random access solid-state storage devices, or may be a non-volatile memory, such as one or more magnetic disk storage devices, optical disc storage devices, or flash memory devices, or other non-volatile solid-state storage devices.

The memory 606 stores a set of instructions executable to the processor 602, including:

an operating system 616, including a program for processing various basis system services and hardware-related tasks; and an application 618, including various programs for implementing the foregoing method, where such programs can implement the processing procedures in the foregoing embodiments; for example, the programs may include the apparatus 500 for implementing an augmented reality picture in FIG. 5.

In addition, each embodiment of this application may be implemented by a data processing program executed by a data processing device, such as a computer. Apparently, the data processing program constitutes this application. In addition, the data processing program usually stored in a storage medium is executed in the following manner: directly reading the program from the storage medium, or installing or duplicating the program into a storage device (such as a hard disk or a memory) of the data processing device. Therefore, such a storage medium also constitutes this application. The storage medium may use a recording mode of any type, for example, a paper storage medium (such as a paper tape), a magnetic storage medium (such as a floppy disk, a hard disk, or a memory), an optical storage medium (such as a CD-ROM), or a magneto-optical storage medium (such as MO).

Therefore, this application further discloses a non-volatile storage medium that stores a data processing program. The data processing program is configured to perform any embodiment of the foregoing method in this application.

In addition, steps of the method according to this application may also be implemented by hardware in addition to the data processing program. For example, the steps may be implemented by a logical gate, a switch, an application-specific integrated circuit (ASIC), a programmable logic controller, an embedded microcontroller, and the like. Therefore, such hardware that can implement the method in this application may also constitute this application.

Described above are merely preferred embodiments of this application, which are not intended to limit this application. Any modification, equivalent replacement, improvement, and the like made within the spirit and principle of this application shall fall within the protection scope of this application.

What is claimed is:

1. A method for implementing an augmented reality picture performed at a computing device having a camera, one or more processors and memory storing a plurality of programs to be executed by the one or more processors, the method comprising:
    obtaining a picture frame using the camera and a pose direction of the camera during shooting of the picture frame;
    determining a framing space in a three-dimensional rectangular coordinate system for the picture frame in accordance with that the camera shoots in a shooting mode, the shooting mode being a shooting mode that uses one point in the three-dimensional rectangular coordinate system as a shooting position and that has a shooting direction the same as the pose direction;
    determining two-dimensional graphics in the framing space, and obtaining three-dimensional coordinates of a position reference point of each determined two-dimensional graphic in the three-dimensional rectangular coordinate system, the position reference point being located in a plane where the two-dimensional graphic is located; and for each determined two-dimensional graphic,
adjusting a pose of the two-dimensional graphic based on a rotation datum point of the two-dimensional graphic, so that the pose-adjusted two-dimensional graphic is at a predetermined angle with respect to the pose direction of the camera, and obtaining three-dimensional coordinates of the position reference point of the pose-adjusted two-dimensional graphic; and projecting, through perspective projection transformation, the three-dimensional coordinates of the position reference point of the two-dimensional graphic to be two-dimensional coordinates in a corresponding planar projection area within the three-dimensional rectangular coordinate system, and rendering, in the planar projection area, the two-dimensional graphic onto the picture frame according to the two-dimensional coordinates, wherein each determined two-dimensional graphic comprises a graphic sequence of a three-dimensional object, and each graphic in the graphic sequence is a two-dimensional image of the three-dimensional object having a respective rotation angle relative to the pose direction of the camera.

2. The method according to claim 1, wherein the operation of determining a framing space in a three-dimensional rectangular coordinate system in accordance with that the camera shoots in a shooting mode comprises:

determining a view frustum, the view frustum corresponding to a shooting mode that uses an origin of the three-dimensional rectangular coordinate system as a shooting position and has a shooting direction the same as the pose direction, so as to determine a framing space in the view frustum in accordance with that the camera shoots in the shooting mode.

3. The method according to claim 1, wherein the operation of rendering, in the planar projection area, the two-dimensional graphic onto the picture frame according to the two-dimensional coordinates comprises:

disposing the picture frame in the planar projection area;
selecting a graphic corresponding to the picture frame from the graphic sequences comprised in the two-dimensional graphic; and
rendering the selected graphic onto the picture frame based on the two-dimensional coordinates.

4. The method according to claim 3, wherein the graphic sequence is associated with a cycle timer, and each graphic in the graphic sequence is associated with a time interval of the cycle timer; and the operation of selecting a graphic corresponding to the picture frame from the graphic sequences comprised in the two-dimensional graphic comprises:
selecting, according to a time interval to which a current time value of the cycle timer belongs, a graphic associated with the time interval from the graphic sequence as the graphic corresponding to the picture frame.

5. The method according to claim 3, wherein a two-dimensional image of each graphic in the graphic sequence is an image of the three-dimensional object that rotates to a corresponding rotation angle based on a predetermined rotation axis, and the operation of selecting a graphic corresponding to the picture frame from the graphic sequences comprised in the two-dimensional graphic comprises:

determining a rotation angle of the two-dimensional graphic, and selecting, from the graphic sequence, a graphic having a rotation angle the same as the determined rotation angle as the graphic corresponding to the picture frame.

6. The method according to claim 1, wherein the three-dimensional rectangular coordinate system comprises an x-axis, a y-axis, and a z-axis; the y-axis is configured to be a vertical direction; the predetermined angle is 90 degrees; and the operation of adjusting a pose based on a rotation datum point of the two-dimensional graphic, so that the two-dimensional graphic is at a predetermined angle with respect to the pose direction, and obtaining three-dimensional coordinates of a position reference point of the pose-adjusted two-dimensional graphic comprises:

rotating the two-dimensional graphic to a corresponding rotation position by using a first line, which passes through the rotation datum point and is parallel to the y-axis, as a rotation central axis, so that a first intersection line is parallel to a second intersection line, wherein the first intersection line is an intersection line between a plane where the two-dimensional graphic is located and a horizontal plane, and the second intersection line is an intersection line between a vertical plane and a horizontal plane of the pose direction; and rotating the two-dimensional graphic at the rotation position to a vertical plane parallel to the pose direction by using a second line, which passes through the rotation datum point and is parallel to the second intersection line, as a rotation central axis.

7. The method according to claim 1, wherein the operation of obtaining a picture frame using the camera and a pose direction of a camera during shooting of the picture frame comprises:

obtaining, from a gyroscope, pose information of the camera during shooting of the picture frame, so as to determine the pose direction.

8. The method according to claim 1, wherein the operation of obtaining a picture frame using the camera and a pose direction of a camera during shooting of the picture frame comprises:

obtaining a picture frame using the camera and pose information of the picture frame that are stored locally, so as to determine the pose direction.

9. The method according to claim 1, wherein the operation of obtaining a picture frame using the camera and a pose direction of a camera during shooting of the picture frame comprises:

obtaining, through a network, a picture frame using the camera and pose information of the picture frame, so as to determine the pose direction.

10. The method according to claim 1, wherein the operation of determining two-dimensional graphics in the framing space, and obtaining three-dimensional coordinates of a position reference point of each determined two-dimensional graphic in the three-dimensional rectangular coordinate system comprises:

arranging at least one two-dimensional graphic in the three-dimensional rectangular coordinate system according to a predetermined policy, wherein each two-dimensional graphic moves in the three-dimensional rectangular coordinate system according to a respective predetermined trajectory;

determining a two-dimensional graphic currently in the framing space; and obtaining the three-dimensional coordinates of the position reference point of each determined two-dimensional graphic in the three-dimensional rectangular coordinate system.

11. A computing device comprising a camera, one or more processors, memory coupled to the one or more processors and a plurality of programs stored in the memory that, when executed by the one or more processors, cause the computing device to perform a plurality of operations comprising:
  obtaining a picture frame using the camera and a pose direction of the camera during shooting of the picture frame;
  determining a framing space in a three-dimensional rectangular coordinate system for the picture frame in accordance with that the camera shoots in a shooting mode, the shooting mode being a shooting mode that uses one point in the three-dimensional rectangular coordinate system as a shooting position and that has a shooting direction the same as the pose direction;
  determining two-dimensional graphics in the framing space, and obtaining three-dimensional coordinates of a position reference point of each determined two-dimensional graphic in the three-dimensional rectangular coordinate system, the position reference point being located in a plane where the two-dimensional graphic is located; and
  for each determined two-dimensional graphic,
  adjusting a pose of the two-dimensional graphic based on a rotation datum point of the two-dimensional graphic, so that the pose-adjusted two-dimensional graphic is at a predetermined angle with respect to the pose direction of the camera, and obtaining three-dimensional coordinates of the position reference point of the pose-adjusted two-dimensional graphic; and
  projecting, through perspective projection transformation, the three-dimensional coordinates of the position reference point of the two-dimensional graphic to be two-dimensional coordinates in a corresponding planar projection area within the three-dimensional rectangular coordinate system, and rendering, in the planar projection area, the two-dimensional graphic onto the picture frame according to the two-dimensional coordinates,
  wherein each determined two-dimensional graphic comprises a graphic sequence of a three-dimensional object, and each graphic in the graphic sequence is a two-dimensional image of the three-dimensional object having a respective rotation angle relative to the pose direction of the camera.

12. The computing device according to claim 11, wherein the operation of determining a framing space in a three-dimensional rectangular coordinate system in accordance with that the camera shoots in a shooting mode comprises:
  determining a view frustum, the view frustum corresponding to a shooting mode that uses an origin of the three-dimensional rectangular coordinate system as a shooting position and has a shooting direction the same as the pose direction, so as to determine a framing space in the view frustum in accordance with that the camera shoots in the shooting mode.

13. The computing device according to claim 11, wherein the operation of rendering, in the planar projection area, the two-dimensional graphic onto the picture frame according to the two-dimensional coordinates comprises:
  disposing the picture frame in the planar projection area;
  selecting a graphic corresponding to the picture frame from the graphic sequences comprised in the two-dimensional graphic; and
  rendering the selected graphic onto the picture frame based on the two-dimensional coordinates.

14. The computing device according to claim 11, wherein the three-dimensional rectangular coordinate system comprises an x-axis, a y-axis, and a z-axis; the y-axis is configured to be a vertical direction; the predetermined angle is 90 degrees; and the operation of adjusting a pose based on a rotation datum point of the two-dimensional graphic, so that the two-dimensional graphic is at a predetermined angle with respect to the pose direction, and obtaining three-dimensional coordinates of a position reference point of the pose-adjusted two-dimensional graphic comprises:
  rotating the two-dimensional graphic to a corresponding rotation position by using a first line, which passes through the rotation datum point and is parallel to the y-axis, as a rotation central axis, so that a first intersection line is parallel to a second intersection line, wherein the first intersection line is an intersection line between a plane where the two-dimensional graphic is located and a horizontal plane, and the second intersection line is an intersection line between a vertical plane and a horizontal plane of the pose direction; and
  rotating the two-dimensional graphic at the rotation position to a vertical plane parallel to the pose direction by using a second line, which passes through the rotation datum point and is parallel to the second intersection line, as a rotation central axis.

15. The computing device according to claim 11, wherein the operation of obtaining a picture frame using the camera and a pose direction of a camera during shooting of the picture frame comprises:
  obtaining, from a gyroscope, pose information of the camera during shooting of the picture frame, so as to determine the pose direction.

16. The computing device according to claim 11, wherein the operation of obtaining a picture frame using the camera and a pose direction of a camera during shooting of the picture frame comprises:
  obtaining a picture frame using the camera and pose information of the picture frame that are stored locally, so as to determine the pose direction.

17. The computing device according to claim 11, wherein the operation of obtaining a picture frame using the camera and a pose direction of a camera during shooting of the picture frame comprises:
  obtaining, through a network, a picture frame using the camera and pose information of the picture frame, so as to determine the pose direction.

18. The computing device according to claim 11, wherein the operation of determining two-dimensional graphics in the framing space, and obtaining three-dimensional coordinates of a position reference point of each determined two-dimensional graphic in the three-dimensional rectangular coordinate system comprises:
  arranging at least one two-dimensional graphic in the three-dimensional rectangular coordinate system according to a predetermined policy, wherein each two-dimensional graphic moves in the three-dimensional rectangular coordinate system according to a respective predetermined trajectory;
  determining a two-dimensional graphic currently in the framing space; and obtaining the three-dimensional coordinates of the position reference point of each determined two-dimensional graphic in the three-dimensional rectangular coordinate system.

19. A non-transitory computer readable storage medium storing a plurality of machine readable instructions in connection with a computing device having a camera, one or more processors, wherein the plurality of machine readable instructions, when executed by the one or more processors, cause the computing device to perform a plurality of operations including:

obtaining a picture frame using the camera and a pose direction of the camera during shooting of the picture frame;

determining a framing space in a three-dimensional rectangular coordinate system for the picture frame in accordance with that the camera shoots in a shooting mode, the shooting mode being a shooting mode that uses one point in the three-dimensional rectangular coordinate system as a shooting position and that has a shooting direction the same as the pose direction;

determining two-dimensional graphics in the framing space, and obtaining three-dimensional coordinates of a position reference point of each determined two-dimensional graphic in the three-dimensional rectangular coordinate system, the position reference point being located in a plane where the two-dimensional graphic is located; and for each determined two-dimensional graphic, adjusting a pose of the two-dimensional graphic based on a rotation datum point of the two-dimensional graphic, so that the pose-adjusted two-dimensional graphic is at a predetermined angle with respect to the pose direction of the camera, and obtaining three-dimensional coordinates of the position reference point of the pose-adjusted two-dimensional graphic; and projecting, through perspective projection transformation, the three-dimensional coordinates of the position reference point of the two-dimensional graphic to be two-dimensional coordinates in a corresponding planar projection area within the three-dimensional rectangular coordinate system, and rendering, in the planar projection area, the two-dimensional graphic onto the picture frame according to the two-dimensional coordinates, wherein each determined two-dimensional graphic comprises a graphic sequence of a three-dimensional object, and each graphic in the graphic sequence is a two-dimensional image of the three-dimensional object having a respective rotation angle relative to the pose direction of the camera.

20. The non-transitory computer readable storage medium according to claim 19, wherein the operation of determining a framing space in a three-dimensional rectangular coordinate system in accordance with that the camera shoots in a shooting mode comprises:

determining a view frustum, the view frustum corresponding to a shooting mode that uses an origin of the three-dimensional rectangular coordinate system as a shooting position and has a shooting direction the same as the pose direction, so as to determine a framing space in the view frustum in accordance with that the camera shoots in the shooting mode.

* * * * *